/ United States Patent (12) United States Patent
Shin (10) Patent No.: US 11,155,181 B2
(45) Date of Patent: Oct. 26, 2021

(54) METHOD AND SYSTEM FOR CALCULATING DISTANCE TO EMPTY OF ECO-FRIENDLY VEHICLE

(71) Applicants: HYUNDAI MOTOR COMPANY, Seoul (KR); KIA MOTORS CORPORATION, Seoul (KR)

(72) Inventor: Hyun Woo Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 227 days.

(21) Appl. No.: 16/397,798

(22) Filed: Apr. 29, 2019

(65) Prior Publication Data

US 2020/0164761 A1    May 28, 2020

(30) Foreign Application Priority Data

Nov. 26, 2018   (KR) .......................... 10-2018-0147346

(51) Int. Cl.
*B60L 58/12* (2019.01)
*B60L 58/26* (2019.01)
*B60H 1/00* (2006.01)

(52) U.S. Cl.
CPC .......... *B60L 58/12* (2019.02); *B60H 1/00278* (2013.01); *B60L 58/26* (2019.02); *B60L 2240/545* (2013.01); *B60L 2260/52* (2013.01); *B60L 2260/54* (2013.01)

(58) Field of Classification Search
None
See application file for complete search history.

(56) References Cited

U.S. PATENT DOCUMENTS

| 2013/0204456 | A1* | 8/2013 | Tippelhofer | .......... B60L 53/305 701/1 |
| 2014/0277872 | A1* | 9/2014 | MacNeille | .......... G01C 21/3415 701/22 |
| 2018/0304765 | A1* | 10/2018 | Newman | .................. B60L 58/26 |
| 2019/0070924 | A1* | 3/2019 | Mancini | ............. B60H 1/00278 |

FOREIGN PATENT DOCUMENTS

| KR | 20130021979 | 3/2013 |
| KR | 10-1855759 | 5/2018 |

OTHER PUBLICATIONS

Wu et al., "A Battery Management System for Electric Vehicle Based on Zigbee and CAN", 2011 4th International Congress on Image and Signal Processing, p. 2517-2521 (Year: 2011).*
Yang et al., "Electric-Vehicle Navigation System Based on Power Consumption", IEEE Transactions on Vehicular Technology, vol. 65, No. 8, p. 5930-5943 (Year: 2016).*

* cited by examiner

*Primary Examiner* — Tamara L Weber
(74) *Attorney, Agent, or Firm* — Mintz Levin Cohn Ferris Glovsky and Popeo, P.C.; Peter F. Corless (57) ABSTRACT

A method for calculating a distance to empty (DTE) of an eco-friendly vehicle is provided. The method includes determining a travel route along which the vehicle travels to a received destination, estimating cooling power consumption for cooling a battery by reflecting travel information predicted for the determined travel route, and calculating the DTE by reflecting the estimated cooling power consumption.

12 Claims, 4 Drawing Sheets

| OUTSIDE AIR TEMPERATURE [℃] | | 20 | | 30 | | 40 | |
|---|---|---|---|---|---|---|---|
| AMOUNT OF SOLAR RADIATION [W] | | 0 | 500 | 0 | 500 | 0 | 500 |
| DISCHARGE CURRENT [A] | 30 | T = f1(t) | T = f2(t) | T = f3(t) | T = f4(t) | T = f5(t) | T = f6(t) |
| | 50 | T = f7(t) | T = f8(t) | T = f9(t) | T = f10(t) | T = f11(t) | T = f12(t) |
| | 100 | T = f13(t) | T = f14(t) | T = f15(t) | T = f16(t) | T = f17(t) | T = f18(t) |

FIG. 4

| OUTSIDE AIR TEMPERATURE [°C] | | 20 | | 30 | | 40 | |
|---|---|---|---|---|---|---|---|
| AMOUNT OF SOLAR RADIATION [W] | | 0 | 500 | 0 | 500 | 0 | 500 |
| DISCHARGE CURRENT [A] | 30 | X1 | X2 | X3 | X4 | X5 | X6 |
| | 50 | X7 | X8 | X9 | X10 | X11 | X12 |
| | 100 | X13 | X14 | X15 | X16 | X17 | X18 |

METHOD AND SYSTEM FOR CALCULATING DISTANCE TO EMPTY OF ECO-FRIENDLY VEHICLE

CROSS-REFERENCE TO RELATED APPLICATION

The present application claims priority to and the benefit of Korean Patent Application No. 10-2018-0147346, filed on Nov. 26, 2018, which is incorporated herein by reference in its entirety.

TECHNICAL FIELD

The present disclosure relates to a method and system for calculating a distance to empty (DTE) of an eco-friendly vehicle, and more particularly to a technique for predicting the power consumed by cooling a battery module in order to improve the accuracy of calculation of a DTE.

BACKGROUND

The statements in this section merely provide background information related to the present disclosure and may not constitute prior art.

Similar to the case in which an internal combustion engine vehicle predicts a distance to empty (DTE) based on a fuel-filling amount and informs a driver of the predicted DTE, eco-friendly vehicles such as electric vehicles and hybrid vehicles provide a function of estimating the DTE based on a current remaining battery charge and displaying the estimated DTE on a cluster or the like.

Particularly, in the case of an electric vehicle, the driving distance on a single charge is limited, and thus the provided DTE is crucial driving information for a driver.

An electric vehicle according to the related art uses a method of calculating a DTE using a state of charge (SOC), which is a residual charge amount of a high-voltage battery, and the fuel efficiency of the electric vehicle, that is, energy consumption efficiency (km/kWh).

However, when a battery module is cooled in order to secure the durability of a battery, power consumption due to driving of a compressor or the like occurs. However, in the related art, there is a problem in that the DTE is calculated without considering the power consumed by cooling the battery module, and thus the vehicle cannot travel until an estimated DTE.

It should be understood that the foregoing description of the background art is merely for the purpose of promoting an understanding of the background of the present disclosure, and is not to be construed as admitting that the present disclosure corresponds to the prior art known to those skilled in the art.

SUMMARY

The present disclosure provides a method and system for predicting the power consumed by cooling a battery module in order to improve durability and for considering the predicted power in the calculation of a distance to empty (DTE), thereby improving the accuracy of calculation of the DTE.

In one form of the present disclosure, a method for calculating a DTE of an eco-friendly vehicle includes: determining a travel route along which the vehicle travels to an input destination; estimating cooling power consumption for cooling a battery by reflecting travel information predicted for the determined travel route; and calculating the DTE by reflecting the estimated cooling power consumption.

The estimating cooling power consumption may include: determining whether the battery is required to be cooled by predicting the temperature of the battery in each section of a plurality of sections into which the determined travel route is divided; and estimating the cooling power consumption for cooling the battery in a section in which the battery is required to be cooled.

The determining whether the battery is required to be cooled may include: determining a section in which the temperature of the battery, accumulated and estimated based on an outside air temperature, an amount of solar radiation, and a predicted discharge current of the battery, is equal to or higher than a predetermined cooling temperature to be the section in which the battery is required to be cooled.

The estimating the cooling power consumption for cooling the battery may include: estimating power consumption for cooling the battery based on an outside air temperature, an amount of solar radiation, and a predicted discharge current of the battery in the section in which the battery is required to be cooled.

The predicted discharge current of the battery may be predicted by reflecting real-time road information in the section of the plurality of sections into which the determined travel route is divided.

The estimating the cooling power consumption may include: estimating the cooling power consumption using a cooling power consumption map for cooling the battery according to a previously mapped outside air temperature, an amount of solar radiation, and a discharge current of the battery, and wherein a previously mapped cooling power consumption map is updated using power consumption data based on actual travel.

The calculating the DTE may include: calculating the DTE based on driving power predicted for the determined travel route and the estimated cooling power consumption.

The calculating the DTE may include: calculating final energy consumption efficiency by reflecting the driving power predicted for the determined travel route and the estimated cooling power consumption and calculating the DTE based on the calculated final energy consumption efficiency and a state of charge of the battery.

The calculating the DTE may include: calculating cooling energy consumption efficiency, obtained by subtracting final energy consumption efficiency, in which the driving power and the estimated cooling power consumption are reflected, from driving energy consumption efficiency predicted for the determined travel route, and calculating the DTE by subtracting a cooling distance according to the cooling energy consumption efficiency from a driving distance according to the driving energy consumption efficiency.

In another form of the present disclosure, a system for calculating a DTE of an eco-friendly vehicle includes: a navigation device configured to determine a travel route along which the vehicle travels to a destination received from a user; a cooling control unit configured to estimate cooling power consumption for cooling a battery by reflecting travel information predicted for the travel route determined by the navigation device; and a vehicle control unit configured to calculate the DTE by reflecting the cooling power consumption estimated by the cooling control unit.

The cooling control unit may determine whether the battery is required to be cooled by predicting the temperature of the battery in each section of a plurality of sections into which the determined travel route is divided, and may estimate power consumption for cooling the battery in a section in which the battery is required to be cooled.

The system may further include: a temperature sensor, configured to measure an outside air temperature of the vehicle; and a solar radiation sensor, configured to measure an amount of external solar radiation, wherein the cooling control unit determines a section in which the temperature of the battery, accumulated and estimated based on the outside air temperature measured by the temperature sensor, the amount of solar radiation measured by the solar radiation sensor, and a predicted discharge current of the battery according to the travel information, is equal to or higher than a predetermined cooling temperature to be the section in which the battery is required to be cooled.

The system may further include: a memory in which a previously mapped cooling power consumption map for cooling the battery according to an outside air temperature, an amount of solar radiation, and a discharge current of the battery is stored, wherein the cooling control unit estimates the power consumption for cooling the battery according to the outside air temperature and the amount of solar radiation, which are measured using the previously mapped cooling power consumption map stored in the memory, and a predicted discharge current of the battery in the section in which the battery is required to be cooled, and the previously mapped cooling power consumption map is updated using power consumption data based on actual travel.

The vehicle control unit may calculate the DTE based on driving power predicted for the determined travel route and the estimated cooling power consumption.

As described above, according to a method and system for calculating a DTE of an eco-friendly vehicle, it is possible to accurately estimate a distance that the vehicle can actually travel by reflecting cooling power consumption in the calculation of the DTE.

As a result, it is possible to set charging and traveling strategies of a battery with improved reliability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and functional descriptions of the forms of the present disclosure which are disclosed in the specification are illustrated only for description of the forms of the present disclosure, and the forms of the present disclosure may be carried out in various manners, but it is not to be interpreted that the present disclosure is limited to the forms described in the specification.

Although the terms "first," "second," etc. may be used herein to describe various elements, these elements should not be limited by these terms. These terms are used to distinguish one element from another. For example, a first element could be termed a second element, and, similarly, a second element could be termed a first element, without departing from the scope of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless otherwise defined, all terms (including technical and scientific terms) used herein have the same meanings as those commonly understood by one of ordinary skill in the art to which this disclosure belongs. It will be further understood that terms, such as those defined in commonly used dictionaries, should be interpreted as having meanings consistent with their meanings in the context of the relevant art, and are not to be interpreted in an idealized or overly formal sense unless expressly so defined herein.

Hereinafter, some forms of the present disclosure will be described in detail with reference to the accompanying drawings. Like reference symbols in the drawings denote like elements.

Figure 1:
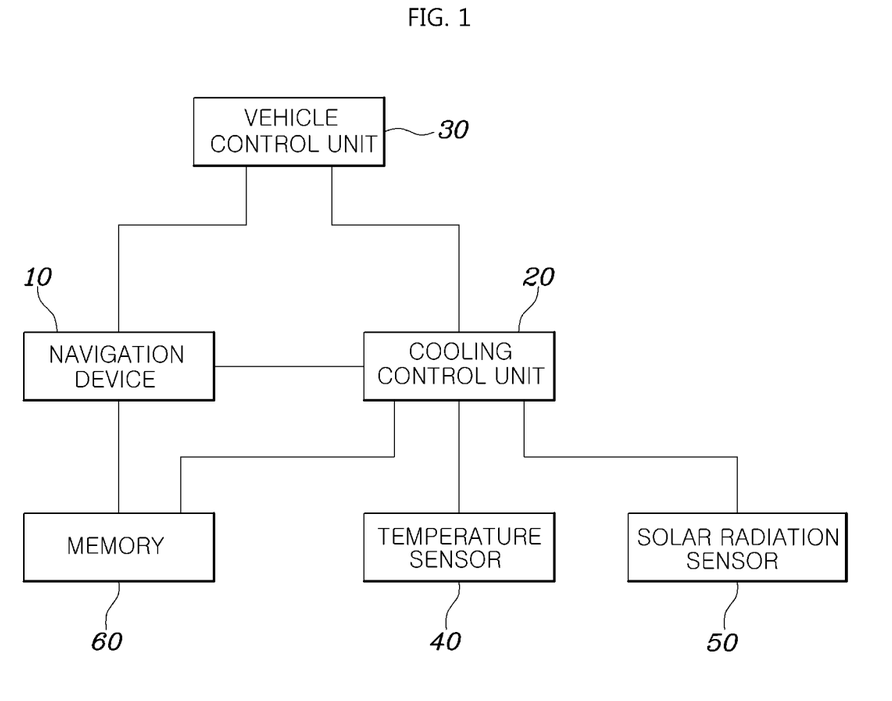
FIG. 1 is a configuration diagram illustrating a system for calculating a distance to empty (DTE) of an eco-friendly vehicle in one form of the present disclosure.
Figure 2:
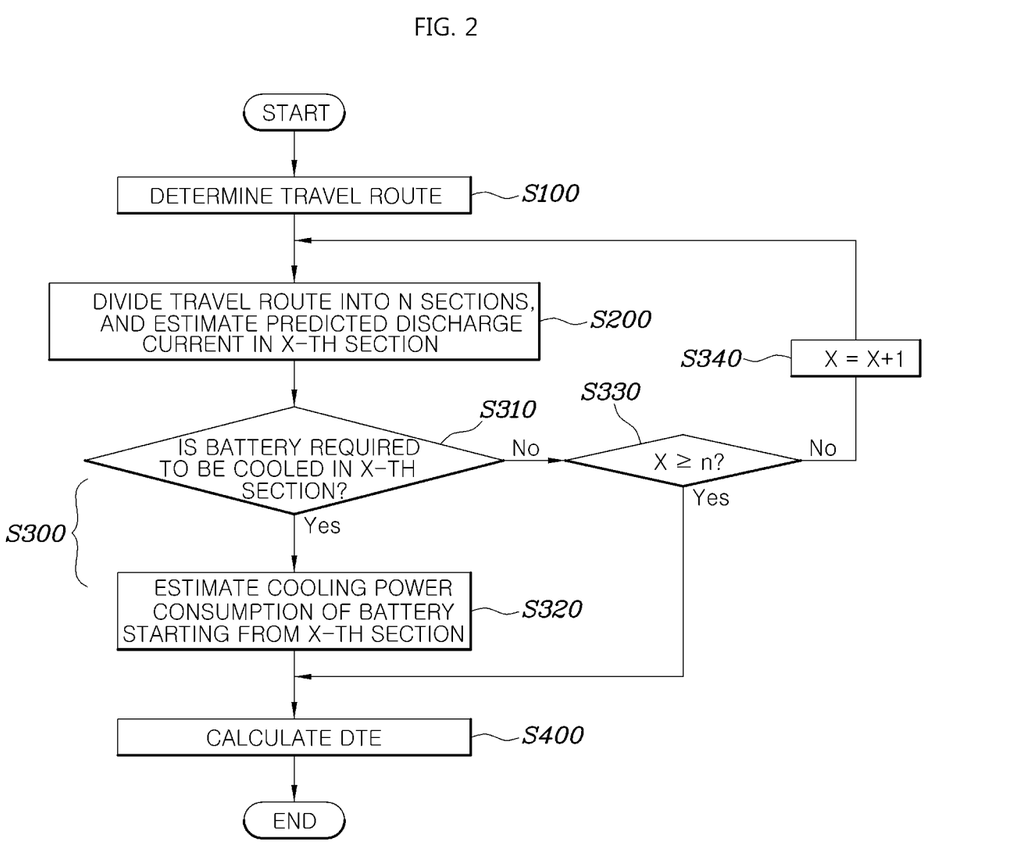
FIG. 2 is a flowchart illustrating a method for calculating a DTE of an eco-friendly vehicle in one form of the present disclosure.

FIG. 1 is a configuration diagram illustrating a system for calculating a distance to empty (DTE) of an eco-friendly vehicle in some forms of the present disclosure, and FIG. 2 is a flowchart illustrating a method for calculating a DTE of an eco-friendly vehicle in some forms of the present disclosure.

Referring to FIGS. 1 and 2, a system for calculating a DTE of an eco-friendly vehicle in some forms of the present disclosure may include: a navigation device 10 configured to determine a travel route along which the vehicle travels to a destination received from a user; a cooling control unit 20 configured to estimate cooling power consumption for cooling a battery by reflecting travel information predicted for the travel route determined by the navigation device 10; and a vehicle control unit 30 configured to calculate the DTE by reflecting the cooling power consumption estimated by the cooling control unit 20.

The navigation device 10 may determine the travel route by receiving the destination from the user. The navigation device 10 is included in a multimedia system (audio/video/navigation {AVN}) of the vehicle. The navigation device 10 may receive the destination directly or indirectly from the user and may determine an appropriate travel route according to map information or road information that is stored in advance or received in real time. A plurality of travel routes may be set and may be selected and determined by the user.

The cooling control unit 20 may control the battery to be cooled so that the battery is not exposed to a high temperature in order to secure the durability of the battery. Specifically, the cooling control unit 20 may control cooling using cooling water or cooling using a separate refrigerant, and may control, for example, an RPM of a pump for controlling the flow of the cooling water or the refrigerant or a compressor for compressing the refrigerant.

The vehicle control unit (VCU) 30 may be an upper control unit that controls controllers of the entire vehicle including the cooling control unit 20. In calculating the DTE according to a state of charge (SOC [%]) of the battery, the vehicle control unit 30 may reflect the cooling power consumption estimated by the cooling control unit 20.

According to the related art, by the cooling power consumption for driving the compressor or pump for cooling the battery, the DTE is calculated to be larger than an actual DTE by 20 [km] or more, thereby being inconvenient to a driver. However, according to the present disclosure, the distance that the vehicle can actually travel may be more accurately estimated by reflecting the cooling power consumption in calculation of the DTE, so that battery charging and traveling strategies can be set with improved reliability.

The cooling control unit 20 may determine whether the battery is required to be cooled by predicting the temperature of the battery in each section of the plurality of sections into which the determined travel route is divided, and may estimate the power consumption required for cooling the battery in the section in which the battery is required to be cooled.

The system for calculating a DTE of an eco-friendly vehicle in some forms of the present disclosure may further include: a temperature sensor 40, configured to measure the outside air temperature of the vehicle; and a solar radiation sensor 50, configured to measure the amount of external solar radiation. The temperature sensor 40 may measure the outside temperature of the vehicle, and the solar radiation sensor 50 may measure the radiant energy of light radiated from the outside of the vehicle to the vehicle. Accordingly, it is possible to estimate whether the battery is required to be cooled or to estimate the extent to which the battery is to be cooled in consideration of the heat dissipation performance of the battery.

The system for calculating a DTE of an eco-friendly vehicle in some forms of the present disclosure may further include a memory 60 in which a previously mapped cooling power consumption map for cooling the battery according to the outside air temperature, the amount of solar radiation, and the discharge current of the battery is stored. In the memory 60, the cooling power consumption map for cooling the battery according to the outside air temperature, the amount of solar radiation, and the discharge current of the battery may be previously mapped, and the previously mapped cooling power consumption map may be updated using power consumption data based on actual travel of the vehicle.

In particular, referring to FIG. 2, a method for calculating a DTE of an eco-friendly vehicle using the above-described system in some forms of the present disclosure may include: operation S100 of determining a travel route along which the vehicle travels to an input destination; operation S300 of estimating cooling power consumption for cooling a battery by taking into consideration travel information predicted for the determined travel route; and operation S400 of calculating the DTE by reflecting the estimated cooling power consumption.

In operation S100 of determining the travel route along which the vehicle travels to the received destination, the navigation device 10 may determine the travel route to a destination received directly or indirectly from a user. The navigation device 10 may determine an optimal travel route by reflecting map information previously stored in the memory 60, or may map information and real-time traffic information transmitted through communication.

In operation S300 of estimating the cooling power consumption, the cooling power consumption may be estimated in consideration of the travel information predicted for the travel route determined by the navigation device 10. Here, the travel information may include all conditions such as energy consumption efficiency (km/kWh) for each road of the travel route, the outside air temperature, the amount of solar radiation, etc., and may be data through which the calorific value and heat dissipation performance of the battery can be predicted. Here, the energy consumption efficiency (km/kWh) is a unit indicating the distance in kilometers [km] that a car can travel on 1 kilowatt-hour [kWh] of electricity, and is a concept similar to that of fuel efficiency.

The cooling power consumption, which is the power consumed for cooling the battery, may be power consumed by a compressor that compresses a refrigerant or a pump that circulates a refrigerant.

In operation S400 of calculating the DTE, the estimated cooling power consumption may be reflected while the DTE is calculated using the travel information predicted for the travel route. In particular, the DTE may be calculated using available energy [kWh] according to the SOC of the battery, and driving power [kW] and cooling power consumption [kW] of the travel route.

Specifically, operation S300 of estimating the cooling power consumption may include operation S310 of determining whether the battery is required to be cooled by predicting the temperature of the battery in each section of the plurality of sections into which the determined travel route is divided; and operation S320 of estimating power consumption for cooling the battery in a section in which the battery is required to be cooled.

It is possible to divide the travel route into a plurality of sections, to determine whether the battery is to be cooled in each section resulting from the division in operation S310, and to estimate the cooling power consumption in operation S320. This is because the traveling speed, the energy consumption efficiency (km/kWh), whether the battery is required to be cooled, and the cooling power consumption are different from each other in each section of the travel route. The accuracy of the estimation is improved along with an increase in the number of sections resulting from the division, but the estimation becomes more complicated. Accordingly, it is desirable to divide the travel route into an appropriate number of sections according to the type of road or the like.

In operation S310 of determining whether the battery is required to be cooled, a section in which the temperature of the battery, accumulated and estimated on the basis of the outside air temperature, the amount of solar radiation, and a predicted discharge current of the battery, is a predetermined cooling temperature or higher may be determined to be a section in which the battery is required to be cooled.

Figure 3:
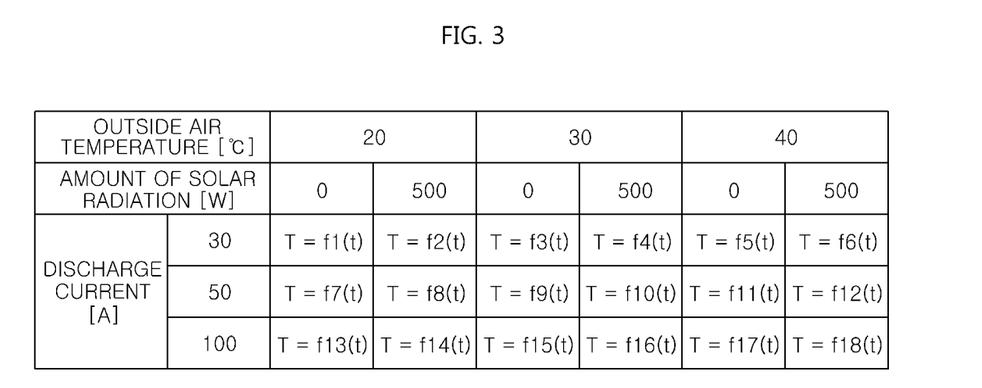
FIG. 3 illustrates a temperature change map of a previously mapped battery in one form of the present disclosure.

FIG. 3 illustrates a temperature change map of a previously mapped battery in some forms of the present disclosure.

Referring to FIG. 3, in the memory 60, a temperature change map of a previously mapped battery may be stored in advance. The temperature change map of the previously mapped battery may previously store different equations depending on the outside air temperature, the amount of solar radiation, and the predicted discharge current of the battery, and may be set as a function according to time t.

The temperature T of the battery may be accumulated and estimated on the basis of the outside air temperature, the amount of solar radiation, and the predicted discharge current of the battery. That is, by accumulating and estimating the temperature change of the battery in each section of the plurality of sections into which the determined travel route is divided, it is possible to determine whether the temperature of the battery is the predetermined cooling temperature or higher.

Specifically, in operation S200, the travel route may be divided into N sections, and the predicted discharge current of the battery may be estimated in each section. In addition, when the travel route is divided into N sections, in operation S330, the temperature of the battery may be estimated based on the outside air temperature and the amount of solar radiation in an x-th section at the temperature of the battery estimated by accumulating the temperatures of the battery up to an (x−1)-th section, and the predicted discharge current of the battery in the x-th section. In operation S340, the temperature of the battery may be estimated by accumulating the temperatures of the battery up to an N-th section.

When the temperature of the battery estimated by accumulating the temperatures of the battery up to the N-th section is below the predetermined cooling temperature, it may be determined that the cooling power consumption is "0," and thus the cooling power consumption may not be reflected in operation 330.

It may be determined that the battery is cooled starting from a section in which the accumulated and estimated temperature of the battery is the predetermined cooling temperature or higher, and the cooling power consumption for cooling the battery may be estimated. The predetermined cooling temperature may be set in consideration of an appropriate temperature range in which the durability of the battery is not deteriorated, and may be set as, for example, 35° C.

The outside air temperature and the amount of solar radiation may be measured by the temperature sensor 40 and the solar radiation sensor 50, respectively. The predicted discharge current of the battery may be predicted by reflecting real-time road information in the section, among the plurality of sections into which the determined travel route is divided. In particular, the predicted discharge current [A] of the battery may be calculated by dividing, by a battery rated voltage [V], predicted power [kW], which is calculated by dividing, by predicted energy consumption efficiency [km/kWh], a predicted vehicle speed [km/h] in the section of the plurality of sections into which the determined travel route is divided.

Predicted power [kW]=predicted vehicle speed [km/h]/predicted energy consumption efficiency [km/kWh]

Predicted discharge current [A]=1000 [W/kW] * predicted power [kW]/battery rated voltage [V]

In operation S320 of estimating the power consumption for cooling the battery, the power consumption for cooling the battery may be estimated on the basis of the outside air temperature, the amount of solar radiation, and the predicted discharge current of the battery in the section in which the battery is required to be cooled.

Figure 4:
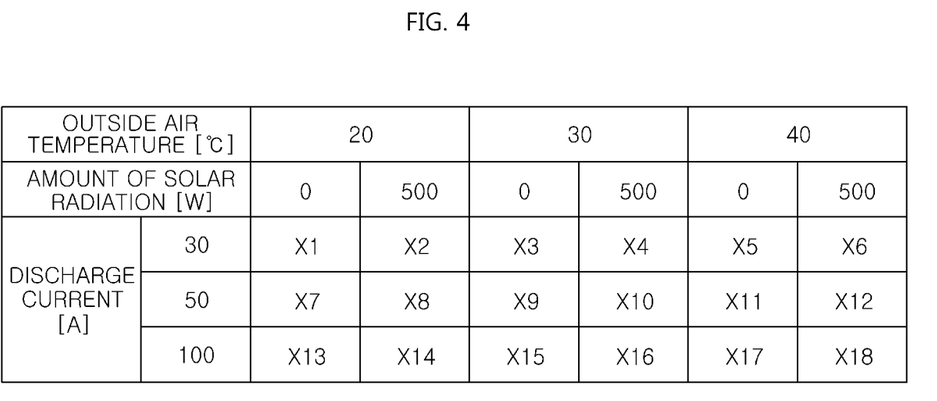
FIG. 4 illustrates a previously mapped cooling power consumption map in one form of the present disclosure.

FIG. 4 illustrates a previously mapped cooling power consumption map in some forms of the present disclosure.

Further referring to FIG. 4, in operation S300 of estimating the cooling power consumption, the cooling power consumption may be estimated using the cooling power consumption map for cooling the battery according to the previously mapped outside air temperature, the amount of solar radiation, and the discharge current of the battery, and the previously mapped cooling power consumption map may be updated using power consumption data according to actual travel of the vehicle.

The previously mapped cooling power consumption map is obtained by mapping the power consumption according to the outside air temperature, the amount of solar radiation, and the discharge current of the battery, and may be experimentally determined. The higher the outside air temperature and the amount of solar radiation and the higher the discharge current of the battery, the higher the power consumption can be set.

In operation S300 of estimating the cooling power consumption, the cooling power consumption may be estimated according to the outside air temperature, the amount of solar radiation, and the predicted discharge current of the battery, which are measured based on the previously mapped cooling power consumption.

In addition, the previously mapped cooling power consumption map may be updated by the power consumption data according to actual travel. That is, it is possible to update the previously mapped cooling power consumption map by storing the cooling power consumption using the power consumption data according to actual travel of the vehicle. Accordingly, actual power consumption may be accurately reflected by reflecting actual traveling data.

In operation S400 of calculating the DTE, the DTE may be calculated on the basis of driving power predicted for the determined travel route and the estimated cooling power consumption.

In some forms of the present disclosure, in operation S400 of calculating the DTE, final energy consumption efficiency may be calculated by reflecting the driving power predicted for the determined travel route and the estimated cooling power consumption, and the DTE may be calculated on the basis of the calculated final energy consumption efficiency and the state of charge of the battery.

The driving power [kW] may be an average value of the driving power in the section of the plurality of sections into which the determined travel route is divided. Specifically, the driving power [kW] may be calculated using the following equation. Here, driving energy consumption efficiency [km/kWh] and an average vehicle speed [km/h] may be travel information received from the navigation device 10.

Driving power [kW]=average vehicle speed [km/h]/driving energy consumption efficiency [km/kWh]

In addition, the final energy consumption efficiency [km/kWh] may be calculated by dividing the average vehicle speed [km/h] by a sum of the driving power [kW] and the cooling power consumption [kW].

Final energy consumption efficiency [km/kWh]=average vehicle speed [km/h]/(driving power [kW]+cooling power consumption [kW])

The DTE [km] may be calculated by multiplying available energy [kWh] according to the state of charge [%] of the battery by the final energy consumption efficiency [km/kWh].

DTE [km]=final energy consumption efficiency [km/kWh]*available energy [kWh]

In another form of the present disclosure, in operation S400 of calculating the DTE, cooling energy consumption efficiency may be calculated by subtracting the final energy consumption efficiency, in which the driving power and the estimated cooling power consumption are reflected, from the driving energy consumption efficiency predicted for the determined travel route, and the DTE may be calculated by subtracting a cooling distance according to the cooling energy consumption efficiency from a driving distance according to the driving energy consumption efficiency.

That is, the DTE [km] may be calculated using the following equations.

Cooling energy consumption efficiency [km/kWh]=driving energy consumption efficiency [km/kWh]−final energy consumption efficiency [km/kWh]

Driving distance [km]=driving energy consumption efficiency [km/kWh]*available energy [kWh]

Cooling distance [km]=cooling energy consumption efficiency [km/kWh]*available energy [kWh]

DTE [km]=driving distance [km]−cooling distance [km]

After operation S400 of calculating the DTE, the calculated DTE may be displayed in the navigation device 10 or the cluster of the vehicle. The calculation of the DTE may be repeated at a predetermined time or distance.

Further, whether the calculated DTE is equal to or longer than a predicted distance to which actual travel for reaching a received destination is required may be determined. When the DTE is less than the predicted distance, a notification may be set in the cluster so that a driver can charge the battery.

In another form of the present disclosure, when the DTE is less than the predicted distance, a traveling mode of the vehicle may be automatically controlled to be switched to an Eco mode. In addition, the output of a motor connected to the battery and supplied with power of the battery can be limited. Accordingly, it is possible to increase the likelihood of reaching the received destination by securing as long a DTE as possible without additional charging.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for calculating a distance to empty (DTE) of a vehicle, the method comprising:
   determining, by a navigation device, a travel route along which the vehicle travels to an input destination;
   estimating, by a cooling controller, cooling power consumption for cooling a battery based on travel information predicted for the travel route;
   calculating, by a vehicle controller, the DTE based on the cooling power consumption;
   determining, by the vehicle controller, whether the calculated DTE is less than a predetermined distance; and
   when it is determined that the calculated DTE is less than the predetermined distance, setting a notification to charge the battery and automatically switch a traveling mode of the vehicle to an economical mode,
   wherein estimating the cooling power consumption further comprises:
      estimating, by the cooling controller, the cooling power consumption using a previously mapped cooling power consumption map that is determined experimentally by mapping the cooling power consumption according to an outside air temperature, an amount of solar radiation, and a discharge current of the battery; and
      updating the previously mapped cooling power consumption map by cooling power consumption data based on actual travel.

2. The method of claim 1, wherein estimating the cooling power consumption comprises:
   determining, by the cooling controller, whether the battery is required to be cooled by predicting a temperature of the battery in each section of a plurality of sections into which the travel route is divided; and
   estimating, by the cooling controller, the cooling power consumption in a section of the plurality of sections that the battery is required to be cooled.

3. The method of claim 2, wherein determining whether the battery is required to be cooled comprises:
   determining, by the cooling controller, a section of the plurality of sections that the temperature of the battery is equal to or higher than a predetermined cooling temperature as the section of the plurality of sections that the battery is required to be cooled, wherein the temperature of the battery is estimated based on an outside air temperature, an amount of solar radiation, and a predicted discharge current of the battery.

4. The method of claim 3, wherein the predicted discharge current of the battery is predicted by reflecting real-time road information in the section of the plurality of sections into which the travel route is divided.

5. The method of claim 2, wherein estimating the cooling power consumption comprises:
   estimating, by the cooling controller, the cooling power consumption is based on the outside air temperature, the amount of solar radiation, and the predicted discharge current of the battery in the section of the plurality of sections that the battery is required to be cooled.

6. The method of claim 1, wherein calculating the DTE comprises:
   calculating, by the vehicle controller, the DTE based on driving power predicted for the travel route and the cooling power consumption.

7. The method of claim 6, wherein calculating the DTE comprises:
   calculating, by the vehicle controller, final energy consumption efficiency by reflecting the driving power predicted for the travel route and the cooling power consumption; and
   calculating, by the vehicle controller, the DTE based on the final energy consumption efficiency and a state of charge of the battery.

8. The method of claim 6, wherein calculating the DTE comprises:
   calculating, by the vehicle controller, cooling energy consumption efficiency by subtracting the final energy consumption efficiency from driving energy consumption efficiency predicted for the travel route; and
   calculating, by the vehicle controller, the DTE by subtracting a cooling distance corresponding to the cooling energy consumption efficiency from a driving distance corresponding to the driving energy consumption efficiency.

9. A system for calculating a distance to empty (DTE) of a vehicle, the system comprising:
   a navigation device configured to determine a travel route along which the vehicle travels to a destination received from a user;
   memory configured to store a previously mapped cooling power consumption map that is determined experimentally by mapping cooling power consumption according to an outside air temperature, an amount of solar radiation, and a discharge current of a battery to cool the battery;

a cooling controller configured to:
- estimate the cooling power consumption for cooling the battery based on travel information predicted for the travel route;
- estimate the cooling power consumption based on the outside air temperature, the amount of solar radiation, and the discharge current of the battery in a section of a plurality of sections that the battery is required to be cooled; and
- update the previously mapped cooling power consumption map using cooling power consumption data based on actual travel; and a vehicle controller configured to:
- calculate the DTE based on the cooling power consumption;
- determine whether the calculated DTE is less than a predetermined distance; and
- when it is determined that the calculated DTE is less than the predetermined distance, set a notification to charge the battery and automatically switch a traveling mode of the vehicle to an economical mode.

10. The system of claim 9, wherein the cooling controller is configured to:
- determine whether the battery is required to be cooled by predicting a temperature of the battery in each section of a plurality of sections into which the travel route is divided; and
- estimate the cooling power consumption in a section of the plurality of sections that the battery is required to be cooled.

11. The system of claim 10, wherein the system further comprises:
- a temperature sensor configured to measure an outside air temperature; and
- a solar radiation sensor configured to measure an amount of solar radiation,
- wherein the cooling controller is configured to determine a section of the plurality of sections that the temperature of the battery is equal to or higher than a predetermined cooling temperature as the section of the plurality of sections that the battery is required to be cooled, and wherein the temperature of the battery is estimated based on the outside air temperature, the amount of solar radiation, and a predicted discharge current of the battery.

12. The system of claim 9, wherein the vehicle controller is configured to calculate the DTE based on driving power predicted for the travel route and the cooling power consumption.

* * * * *